United States Patent
Freidin et al.

(10) Patent No.: US 6,237,014 B1
(45) Date of Patent: May 22, 2001

(54) CORRELATOR METHOD AND APPARATUS

(75) Inventors: Philip Manuel Freidin; David George Decker, both of Sunnyvale; Norman Franklin Krasner, San Carlos, all of CA (US)

(73) Assignee: GE Capital Spacenet Services, Inc., McLean, VA (US)

(*) Notice: Subject to any disclaimer, the term of this patent is extended or adjusted under 35 U.S.C. 154(b) by 0 days.

(21) Appl. No.: 09/557,788

(22) Filed: Apr. 25, 2000

Related U.S. Application Data

(62) Division of application No. 09/050,114, filed on Mar. 30, 1998, now Pat. No. 6,148,313.
(60) Provisional application No. 60/042,836, filed on Apr. 9, 1997.

(51) Int. Cl.[7] ............................................. G06F 17/15
(52) U.S. Cl. .................................................. 708/422
(58) Field of Search .................................. 708/422, 425, 708/550–552, 670, 700–714

(56) References Cited

U.S. PATENT DOCUMENTS

| | | | |
|---|---|---|---|
| 4,679,210 | * | 7/1987 | Rathi ................................... 708/422 |
| 4,761,760 | * | 8/1988 | Tomoji ................................. 708/714 |
| 4,937,775 | * | 6/1990 | Engeler et al. ...................... 708/422 |
| 5,684,727 | * | 11/1997 | Campbell et al. .................... 708/422 |
| 5,931,893 | * | 8/1999 | Dent et al. ........................... 708/422 |

\* cited by examiner

*Primary Examiner*—Tan V. Mai
(74) *Attorney, Agent, or Firm*—Jones Volentine, L.L.C.

(57) ABSTRACT

A programmable digital correlator device, and associated correlation method, with a very efficient structure. In one aspect, two or more correlators share a common data sequence shift register. In another aspect, the data sequence shift register is comprised of random access memory (RAM) modules which allow efficient construction in field programmable gate array (FPGA) logic devices. Two's-complement data samples are multiplied by a reference sequence to produce unfinished two's-complement products, the products are summed with unsigned arithmetic in an adder containing population counters, and a correction factor is added after all other calculations are complete to convert the unsigned result back to a two's-complement number.

7 Claims, 11 Drawing Sheets

CORRELATOR METHOD AND APPARATUS

CROSS REFERENCE TO RELATED APPLICATIONS

This is a divisional application of application Ser. No. 09/050,114, filed Mar. 30, 1998, U.S. Pat. No. 6,148,313, which claims benefit of Ser. No. 60/042,826 filed Apr. 9, 1997.

BACKGROUND OF THE INVENTION

1) Field of the Invention

This invention pertains to the field of digital signal processing and, more particularly, to digital correlation.

2) Background of the Related Art

Correlators have been widely used in signal processing to measure the degree of correspondence between a data sequence and a predetermined pattern or reference sequence. In the case of one-dimensional digital signal processing, a correlation value y representing the correspondence between a sequence of data samples, $d_i$, and a sequence of reference values, $r_i$, is found by:

$$y = \sum_{i=1}^{n} (r_i \cdot d_i)$$

Correlation is used in a number of applications including speech cognition, pattern recognition of printed matter in check-processing equipment, and communication system synchronization.

Correlators have been used in many communication systems to perform receiver clock synchronization. In that case, to facilitate synchronization, a communication transmitter and a communication receiver are each furnished with a reference sequence having a predetermined pattern. The communication transmitter transmits the reference sequence to facilitate synchronization of the receiver clock to the transmitted signal. The reference sequence is chosen to have good autocorrelation properties, e.g., a well-defined correlation peak and relatively low sidelobes.

FIG. 1 shows a communication receiver correlator operating with a correlation reference sequence, which is eight (8) bits in length, to produce a correlation peak at the time when the received data sequence matches the reference sequence. In the example of FIG. 1, it is assumed that each data sample is represented as an 8-bit two's-complement number having a value in the range of ±127. At each clock period, the last eight samples of input data $d_i$ (i=1,8) are multiplied sample by sample against the reference sequence bits $r_i$ (i=1,8) to produce a correlation value y. That is, y may have a maximum value of +1016 and a minimum value of −1016. The correlation value y is compared against a correlation threshold, $y_{TH}$, and whenever y exceeds $y_{TH}$, a correlation match is declared indicating that the correlation sequence has been received and the receiver is thereby synchronized to the transmitter.

Correlators have also been used in direct sequence spread-spectrum communication systems to detect received signals that have been spread for transmission using binary sequences called spreading codes. In this case, the transmitter and receiver are each furnished with a reference sequence having a predetermined pattern corresponding to the spreading code.

The transmitter spreads the original data signal to be transmitted with the spreading code to produce a spread spectrum signal. At the receiver, a despreading correlator recovers the original data signal by correlating the received signal against the reference sequence corresponding to the spreading code.

Correlators have been built using dedicated digital signal processors. However, these devices are limited by their processing speed. Thus, they may not be practical for high speed correlation, especially for very long reference sequences.

FIG. 2 is a block diagram of a conventional programmable digital correlator 100 of length n according to the prior art which may be used for receiver synchronization or for despreading a spread spectrum signal. The correlator 100 comprises a data delay line 101, reference sequence storage 103, multiplier stage 105, and an adder tree 107. The operation of this prior art correlator 100 will now be described.

During an initialization process, a reference sequence of reference values $r_i$ (i=1,n) is stored into the reference sequence storage 103. In the example correlator of FIG. 1, it is assumed that each reference sequence value $r_i$ is represented as a 1-bit binary value. On each reference clock cycle, a new reference sequence value $r_i$ is supplied to the reference sequence storage 103 in the correlator 100. The reference sequence storage 103 is comprised of an n-stage reference shift register further comprised of n 1-bit reference sequence registers 104.

A received data sequence of data samples $d_i$ (i=1,n) is supplied to the correlator 100 for correlation with the reference sequence. In the general case, each data sample $d_i$ is represented as an m-bit binary value. In the example correlator of FIG. 2, m=8. On each data clock cycle, a new data sample $d_i$ is supplied to the data delay line 101 in the correlator 100.

The data delay line 101 is configured as an n-stage data sequence shift-register. On each data clock cycle, a new data sample $d_1$ is shifted byte-wise into first data Register-1 102 of the data delay line. The data sample $d_2$ which had been stored in the first data Register-1 on the previous data clock cycle, is shifted into the second data Register-2. Similarly the data samples $d_i$ in all other data registers are each shifted one register to the right. The oldest data sample, $d_{n+1}$, stored in the last data register Register-n exits the data delay line 101 and is discarded.

Correlation of the data sequence $d_i$ (i=1,n) with the reference sequence $r_i$ (i=1,n) is performed by first multiplying each data sample $d_i$ by a corresponding reference value $r_i$ in the multiplier stage 105. The multiplier stage 105 is comprised of n multipliers 106. The n multipliers 106 produce n correlation multiplication products, $y_i = d_i \cdot r_i$ (i=1, n), each represented as an m-bit binary value, in this example m=8.

The n m-bit correlation multiplication products $y_i$ are then supplied to n/2 first stage adders 108 of the adder tree 107. Each first stage adder 108 adds two of the m-bit correlation multiplication products $y_i$ to produce an (m+1)-bit intermediate correlation sum $z_i$. The n/2 first stage adders 108 produce n/2 intermediate correlation sums $z_i$ which are supplied to n/4 second stage adders in the adder tree 106. This process repeats until final stage adder 109 of the adder tree produces a single (m+log$_2$(n))-bit correlation value y. Thus, the adder tree consists of log$_2$(n) stages with a total number of n−1 adders.

An example of a prior art conventional correlator is the HSP45256, manufactured by Harris Corporation.

The prior art conventional programmable digital correlator 100 requires a large amount of circuitry. For example, consider a correlator of length n=128 for correlating 128 data samples represented as 8-bit numbers with a reference sequence of 128 1-bit numbers. The 128-stage data delay line requires one flip-flop for each bit to be stored. For the 8-bit data samples, the data delay line requires 8*128=1024 flip-flops. The reference sequence storage requires an additional 128 flip-flops, one for each bit in the reference sequence.

When designing with application specific integrated circuits (ASICs), the amount of logic is measured in gates, which are understood to be equivalent 2-input NAND gates. All other gates and flip-flops are converted to the required number of equivalent 2-input NAND gates. For example, a flip-flop is equivalent to at least six 2-input NAND gates.

The data delay line's 1024 flip-flops represent a logic requirement of 1024×6 gates=6144 equivalent 2-input NAND gates, and the reference storage requires 128×6 gates=768 equivalent 2-input NAND gates.

Each multiplier in the correlator must multiply a signed 8-bit data sample by a reference value, which is typically a 1-bit value. The 1-bit reference value can be an encoded value, with a value of '1' indicating '−1', and a value of '0' indicating '+1'.

The result of the multiply is therefore either the same as the sample data (if the reference value is '0'), or it is minus the sample data value (if the reference value is '1'). Each multiplier can therefore be implemented as 8 XOR gates, and an 8 bit incrementor.

For gate count purposes, an XOR gate is equivalent to three 2-input NAND gates, and an incrementor requires about 4 gates per bit. The 8-bit by 1-bit multiplier requires 8×3 gates for the XOR gates, and the 8-bit incrementor requires 8×4 gates. Thus, each multiplier requires (8×3)+(8×4)=56 equivalent 2-input NAND gates. As there are 128 multipliers, this is a total of 128×56=7168 equivalent 2-input NAND gates.

The adder tree requires many more gates. In general, for a correlator of length n, n−1 adders are required. For the example correlator of length 128, with 8-bit data samples, the adder tree comprises 64 8-bit adders producing 9-bit results-, 32 9-bit adders producing 10-bit results, 16 10-bit adders producing 11-bit results, eight 11-bit adders producing 12-bit results, four 12-bit adders producing 13-bit results, two 13-bit adders producing 14-bit results, and one 14-bit adder producing a 15-bit result.

For gate count purposes, an adder requires 7 gates per bit. The adder tree for a correlator of length 128 therefore comprises a total of 1136 bits of adder, which require 1136*7=7952 equivalent 2-input NAND gates.

Thus, the programmable digital correlator of length 128, with 8-bit samples, requires a total of 1152 flip-flops and 15,120 other gates, or a total of at least 22032 gates, plus some small amount of glue logic.

In a spread spectrum system, a receiver may need to have many despreading correlators. For example, in a communication system having a central hub receiver which simultaneously communicates with many transmitters having different spreading codes, the receiver needs to have at least one despreading correlator for each spreading code which may be used. In this case, it is especially important to construct a correlator with an efficient circuit utilization.

For example, consider a spread spectrum receiver for a QPSK modulated spread spectrum signal with a spreading code sequence of length of 128 for both the I and Q waveforms. Assume further that the despreading receiver correlator operates on two samples per symbol to provide coarse timing information to the receiver, such that 256 8-bit samples of the received data are stored for correlation. If the correlator was constructed using the HSP45256 devices referenced above, each receiver would require at least 16 of these devices for each I or Q correlator. If the communication system uses 32 different spreading sequences which must be simultaneously detected, it would then require at least 16*2*32=960 of these devices.

In many low and medium volume applications, it is desired to implement programmable digital correlators using field programmable gate array (FPGA) devices. Unfortunately, a correlator such as the correlator 100 does not lend itself to an efficient construction using FPGA devices using conventional design practice.

For example, a Xilinx XC4025E FPGA has 1024 configurable logic blocks (CLBs). Each CLB contains two flip-flops, one secondary function generator, and two main function generators, each with four inputs and one output. For example, constructing just the 128-stage 8-bit data delay lines, required for two programmable digital correlators of length 128, would consume all 2048 flip-flops in this example Xilinx FPGA. Thus it is not possible according to the prior art to construct in the FPGA two conventional correlators 100 of length 128 for 8-bit data samples.

Indeed, simply fitting one such example correlator into a XILINX® 4025E would be difficult. The Xilinx XC4025E FPGA has a maximum of 25000 gates, of which typically 15000 gates may be able to be actually utilized using standard design practices. As shown above, the correlator of length 128, with 8-bit data samples, requires a minimum of 22032 gates.

Accordingly, it would be advantageous to provide a programmable digital correlator with a larger combination of shift register length and width than has been previously available in a single device. It would also be advantageous to provide a programmable digital correlator which is capable of simultaneously correlating input sampled data against two or more predetermined reference sequences. It would likewise be advantageous to provide a programmable digital correlator for a spread spectrum receiver which can process more than one sample per symbol of input data to provide coarse correlation peak timing information to be used by the receiver. It would further be advantageous to provide a programmable digital correlator which can operate at high speeds. Other and further objects and advantages will appear hereinafter.

SUMMARY OF THE INVENTION

The present invention comprises a digital correlation method and apparatus for performing high speed correlation of long data sequences.

In one aspect of the invention, high speed digital correlation of long data sequences is performed in a single field programmable gate array (FPGA) device. The FPGA provides storage for a long sequence of data samples, programmable storage registers for storing one or more predetermined reference sequences, a plurality of multipliers for multiplying the data samples by reference sequence values to produce correlation products, and adders for summing the correlation products to produce a correlation value.

In another aspect of the invention, a digital correlator stores a data sequence in a long shift register comprised of a plurality of random access memory (RAM) modules. Preferably, the data sequence consists of m-bit data values and the RAM modules are each p bits deep by 1-bit wide. In a preferred embodiment, the correlator processes one bit from each RAM module during each clock cycle.

In still another aspect of the invention, a digital correlator multiplies data samples in a data sequence, represented as two's-complement numbers, by data values in a predetermined data sequence, to produce unfinished two's-complement products. Preferably, the multiplication is performed using exclusive-OR (XOR) gates. The products of all the multiplications are then added to produce a correlation value. At the end of all calculations, a correction value is added to the correlation value to complete the two's-complement arithmetic.

In yet another aspect of the invention, a digital correlator includes an adder which further includes a plurality of population counters. Each population counter produces an output which represents the number of input bits which are set to one. Preferably, each population counter is further comprised of a plurality of pipelined stages.

In a further aspect of the invention, a correlator includes an adder tree having an adder which sums population counter outputs to produce an unsigned binary output. At the end of the correlation calculation, the correlator adds a correction value to produce a two's-complement correlation value. The correction value: (1) compensates for a sign error that results when the population counters treat the input products as unsigned values; and (2) completes the two's-complement operation of the multiplier's which had produced unfinished two's-complement products as described earlier.

DESCRIPTION OF THE PREFERRED EMBODIMENTS

Figure 3A:
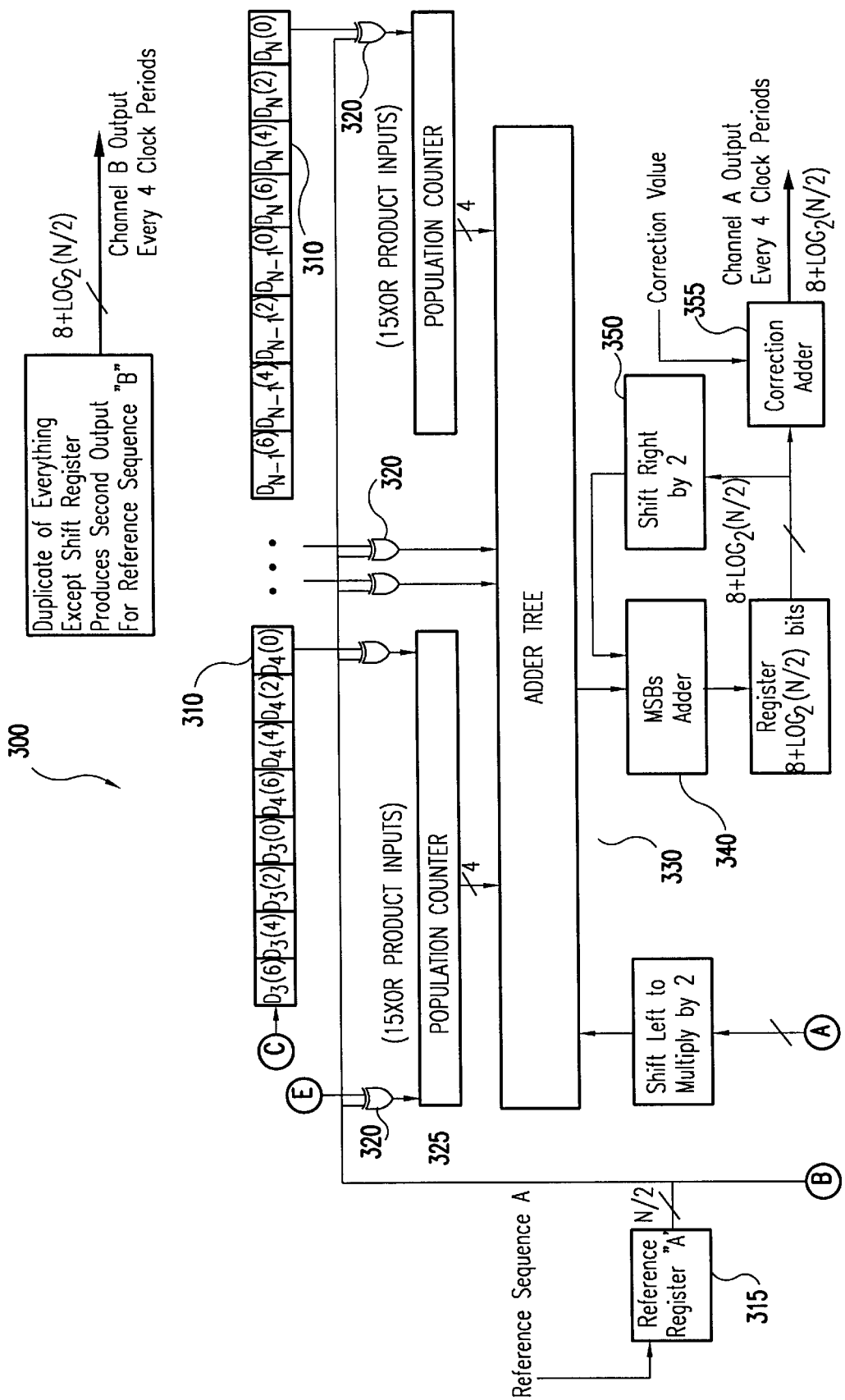
FIG. 3 is a functional block diagram of a programmable digital correlator in accordance with one or more aspects of the present invention.
Figure 3B:
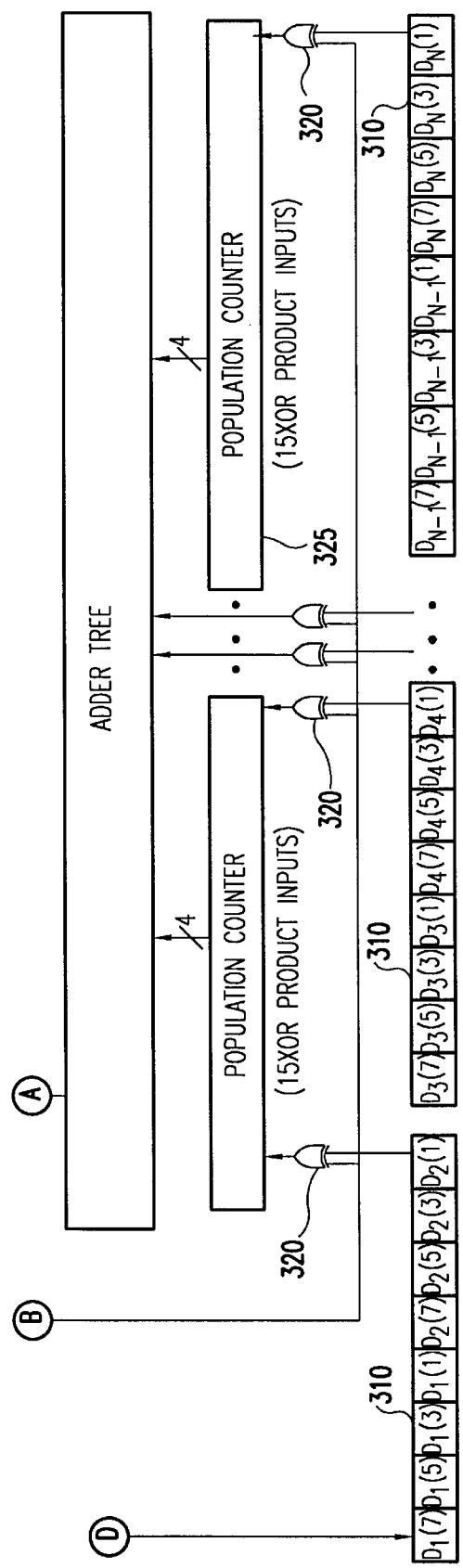
Figure 3C:
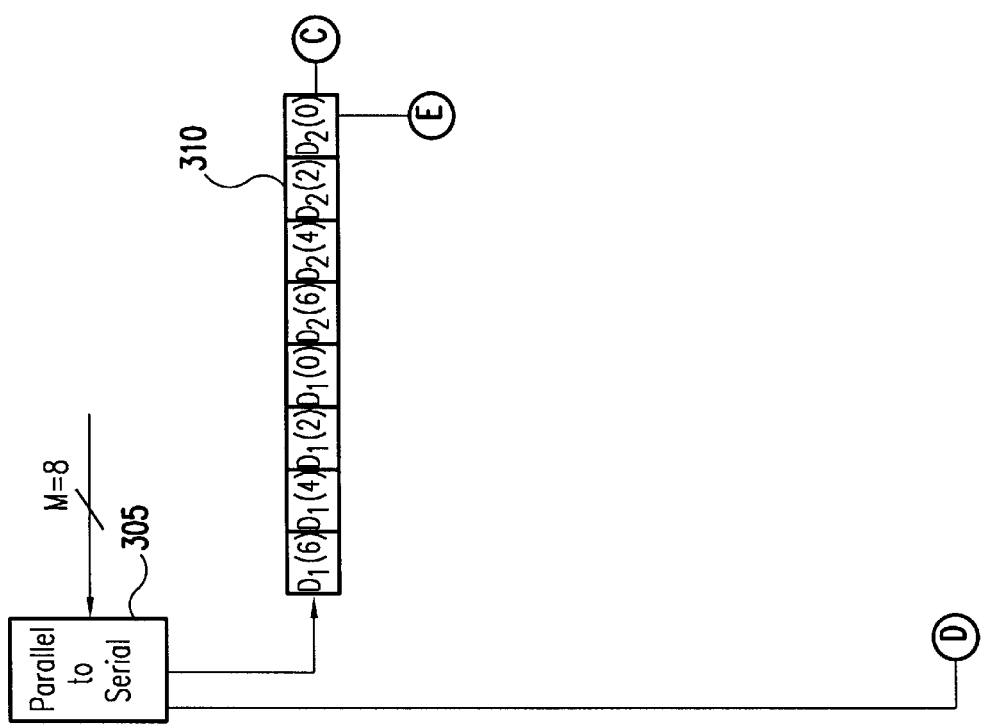
Figure 4A:
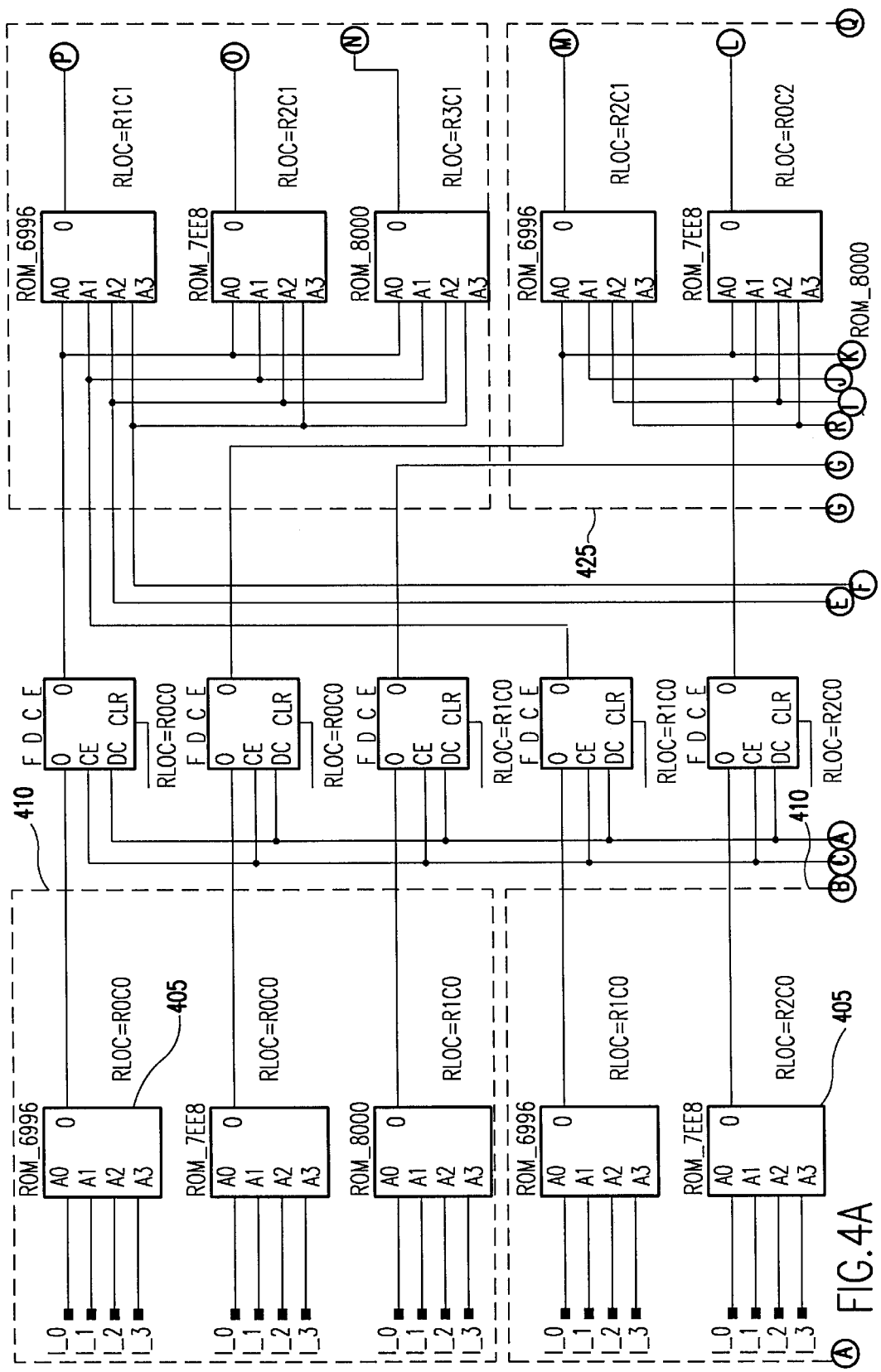
FIG. 4 is a functional block diagram of a 15-bit population counter in accordance with one or more aspects of the present invention.
Figure 4B:
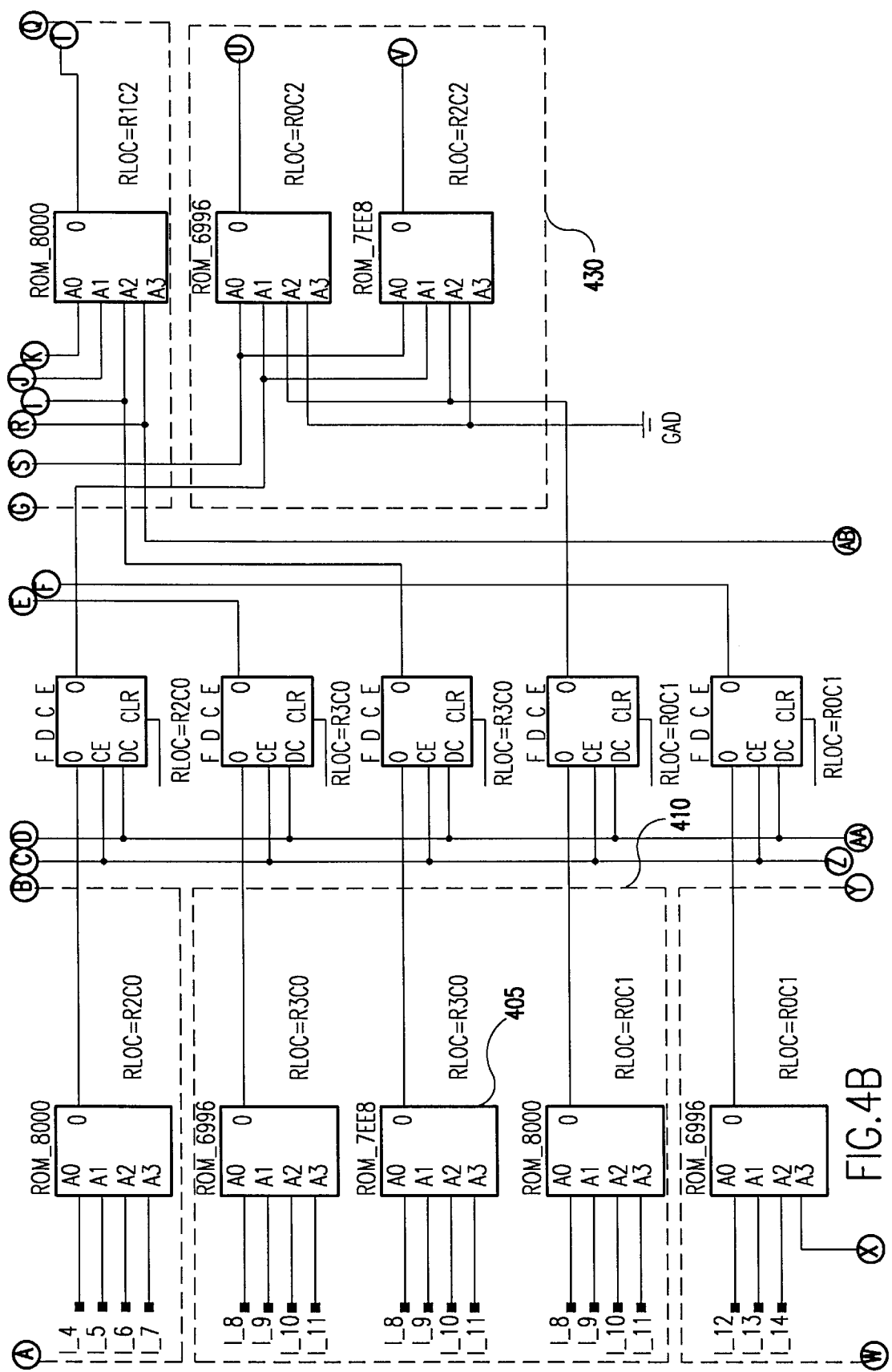
Figure 4C:
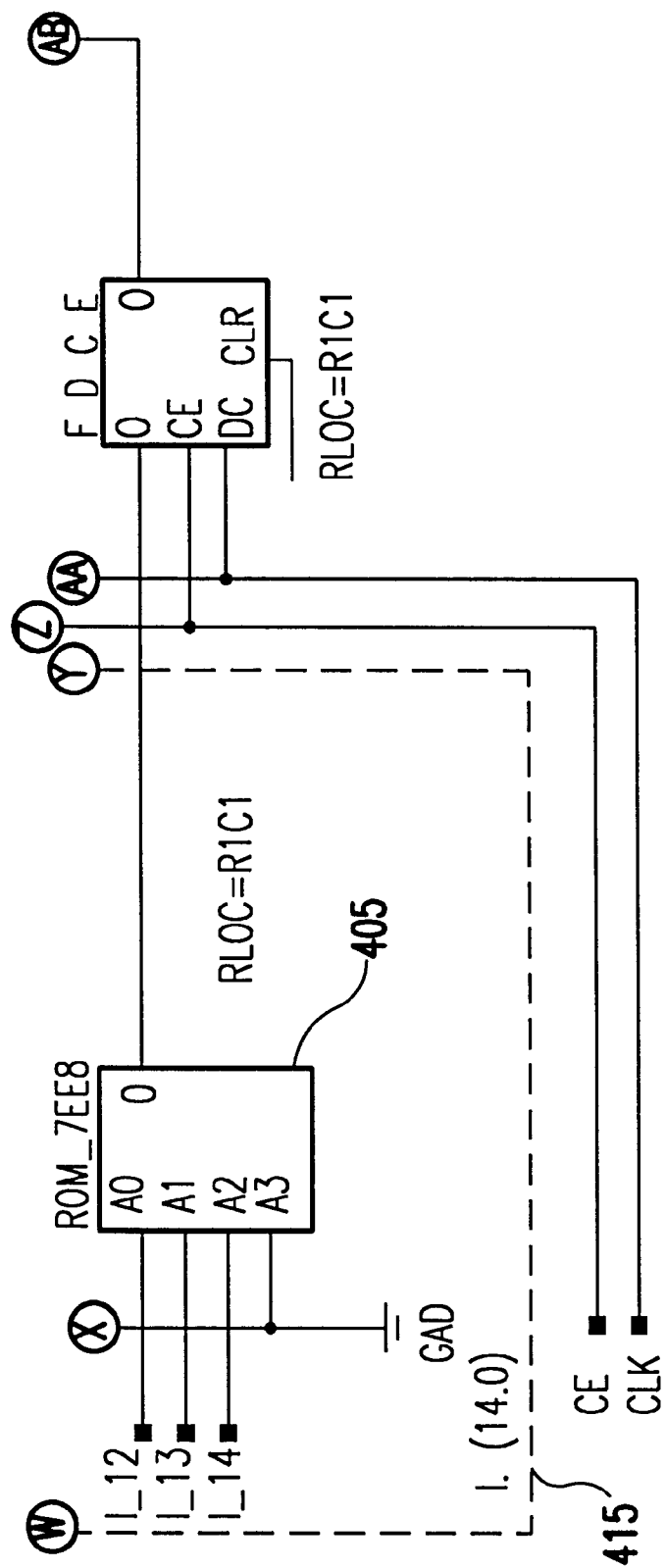
Figure 4D:
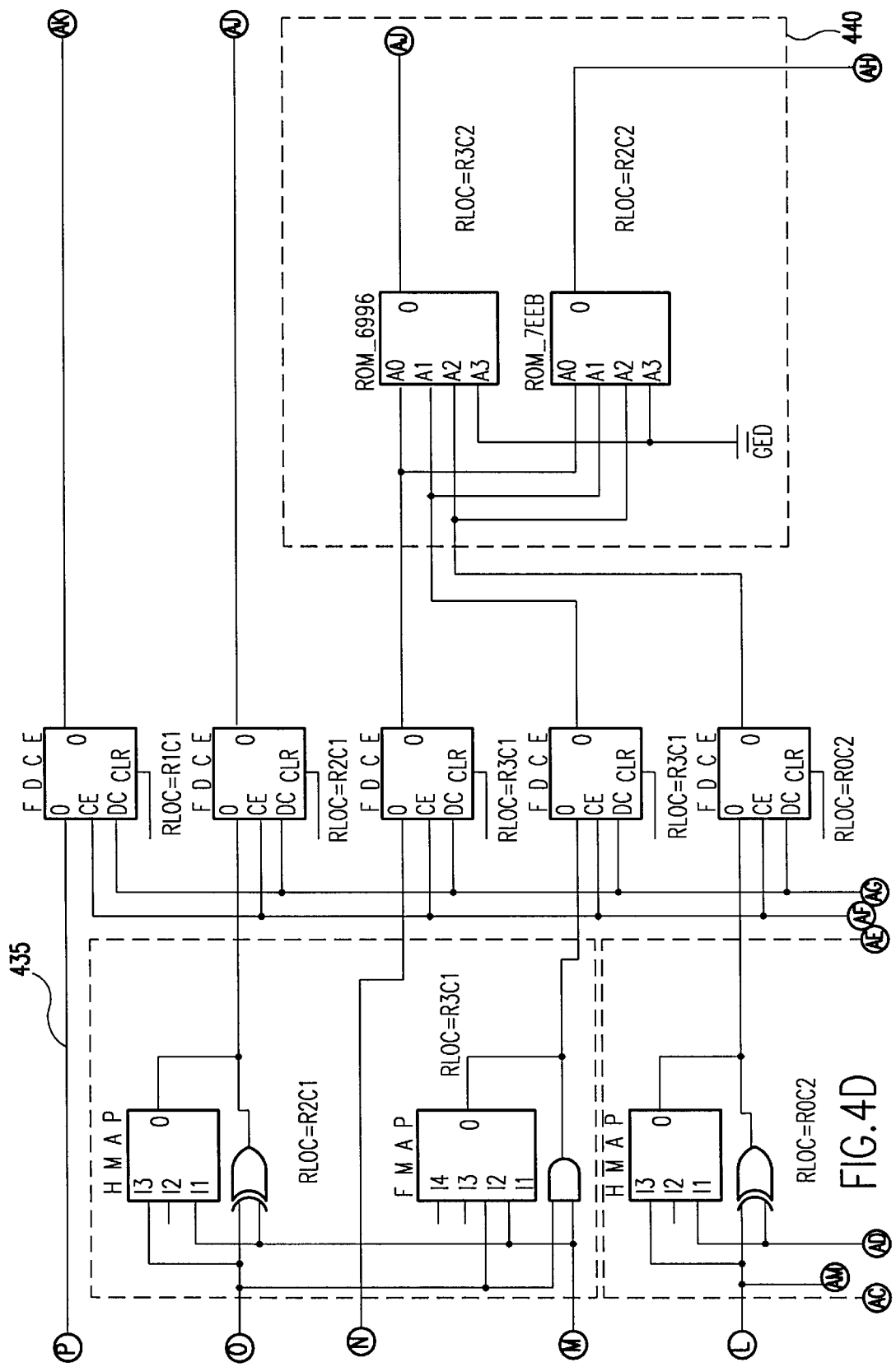
Figure 4E:
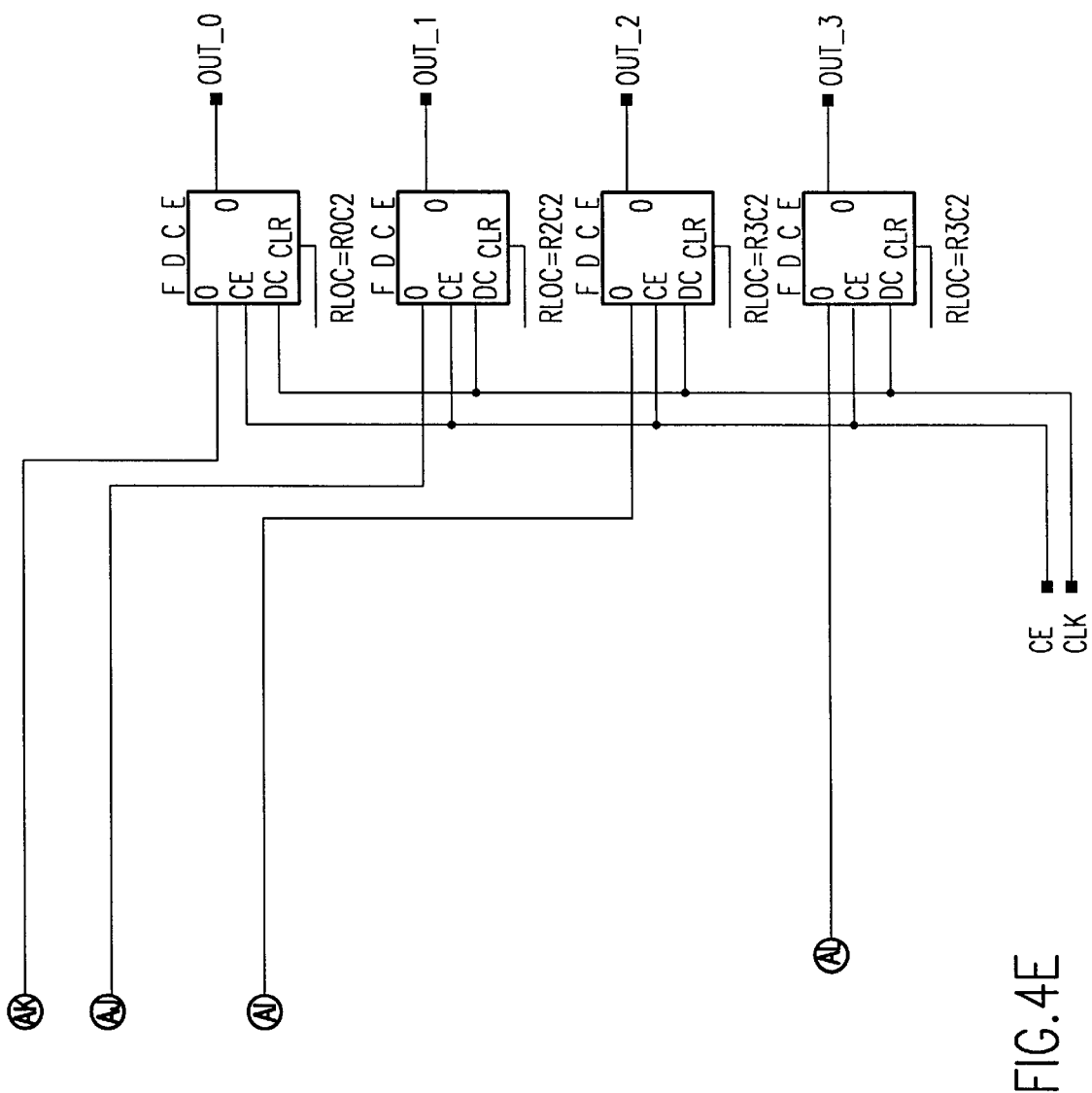
Figure 4F:
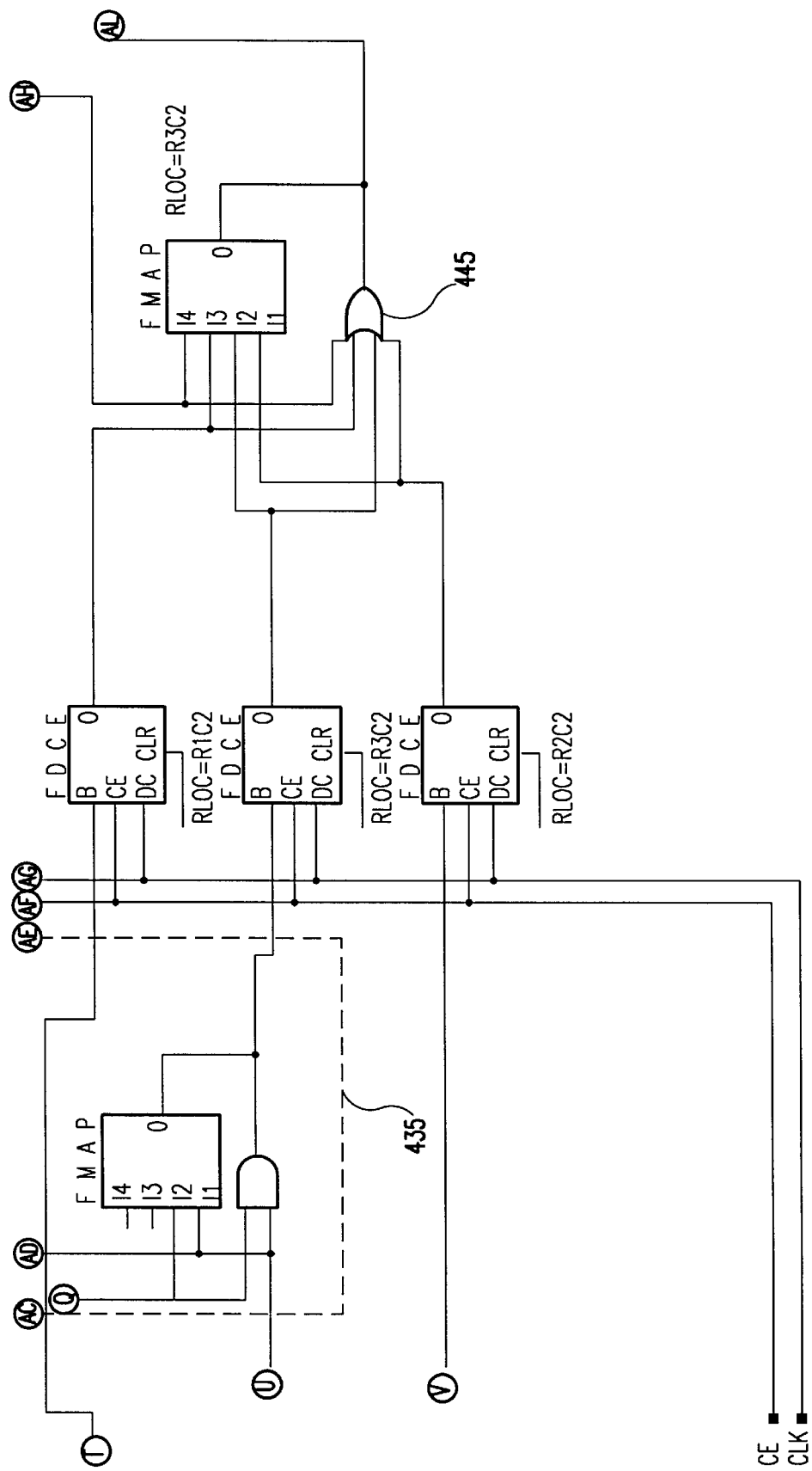

In the preferred embodiment of FIG. 3, a dual correlator 300 simultaneously correlates a single received data sequence against two different predetermined correlation reference sequences denoted as reference sequence "A" and reference sequence "B". The dual correlator provides data sequence storage for the received data sequence, and includes separate storage registers for each of the two correlation reference sequences.

The dual correlator 300 may, for example, process I or Q data from a demodulator in a direct sequence spread spectrum communication receiver. In that case, the correlation reference sequences "A" and "B" may each correspond to one of a plurality of spreading codes which may be used by a plurality of remote communication transmitters. Other aspects and features of this embodiment will be made clear by the detailed description of its operation which follows.

In the exemplary embodiment of FIG. 3, it is assumed that the data samples in the data sequence are represented as 8-bit binary numbers in two's-complement arithmetic. However, it would be understood to those skilled in the art that the data may be represented with more or less bits, e.g., 6 bits or 12 bits, without departing from the spirit and scope of the invention.

The data sequence is provided to a parallel-to-serial converter 305. The tradeoff of parallel arithmetic versus serial arithmetic involves the amount of logic resources required to implement the arithmetic, and the time that is available for the arithmetic to be performed. Parallel arithmetic requires the most logic resources, but completes the operations in one clock cycle. Fully serializing (i.e processing one bit at a time) requires the minimum logic resources, but requires as many clock cycles as there are bits in the operands.

For the preferred embodiment described herein, the 8-bit operands are converted to a serial stream which is 2-bits wide. The 2-bit wide serial stream is then processed over four cycles, at a correlator clock rate that is 4 times faster than the data clock rate, for the 8-bit data samples. This provides for ¼ the logic resource requirements of an 8-bit parallel operation, but requires the serial clock to be 4 times faster. Other embodiments may use a different tradeoff.

The parallel-to-serial converter 305 receives the input data sequence as a series of 8-bit parallel data samples at a data clock rate of W cycles/sec, and serializes it to a 2-bit wide bitstream which is output at a correlator clock rate of 4 W cycles/sec. Thus, the 8-bit data samples in the data sequence which is to be correlated are each available two bits at a time. All eight bits of each data sample are processed over four consecutive correlator clock cycles, corresponding to one data clock cycle.

On a first correlator clock cycle, the parallel-to-serial converter 305 outputs the least significant bit (LSB) $D_1(0)$ and next least significant bit (NLSB) $D_1(1)$ of an input data sample $D_1$. On the second correlator clock cycle, the parallel-to-serial converter provides the next two least significant bits, $D_1(2)$ and $D_1(3)$, and so on until all eight bits are output over four correlator clock cycles. Thereby, the parallel-to-serial converter provides a new data sample to the data sequence shift register for correlation every four correlation clock cycles.

The 2-bit wide data samples from the parallel-to-serial converter 305 are shifted by the correlator clock into a 2-bit wide data sequence shift register comprised of a plurality of random access memory (RAM) modules 310. The data sequence shift register is comprised of two strings of RAM modules, one string for each of the two bits in the 2-bit wide bitstream from the parallel-to-serial converter 305.

In a preferred embodiment, configurable logic block (CLB) random access memory (RAM) structures are used to minimize the CLB requirements of the data sequence shift register. For example, a XILINX® XC4025E CLB can be configured to implement two 16-bit deep by 1-bit wide RAMs. Each RAM is connected to implement a 1-bit wide shift register up to 16-bits long. Together the two RAMs in a CLB can achieve a density of 32 bits per CLB. (The exact length actually implemented is dependent on the speed of the data and the maximum operating speed of the FPGA logic.) In contrast, CLB flip-flops alone represent a density of only 2 bits per CLB.

In the embodiment of FIG. 3, the 2-bit wide data sequence shift register is tapped for correlation using every other data sample. For example, if each of the correlation reference sequences "A" and "B" have a length of N/2, then the data sequence shift register contains N data samples, with a tap for every other data sample, making N/2 data samples available for correlation at a time. For the data samples with 8-bit binary representations, each RAM module is 1-bit wide by 8-bits long, providing a tap for every other data sample as shown in FIG. 3. Address lines (not shown) make one bit available as an output from each RAM module 310 on each correlator clock cycle.

In that case, every four correlation clock cycles, a new correlation value is calculated for the data sequence comprising every other data sample in the 2-bit wide data sequence shift register. For example, the data samples may be I or Q data from a demodulator in a direct sequence spread spectrum communication receiver. In that case, data may be sampled at twice the symbol rate to provide coarse timing information to the receiver and correlation is therefore performed with respect to every other data sample.

In the embodiment of FIG. 3, the 2-bit wide data sequence shift register is comprised of N RAM modules, or two strings of N/2 RAM modules for the 2-bit wide bitstream provided by the parallel-to-serial converter 305.

In a preferred embodiment, each RAM module 310 may be one of two RAM modules in a configurable logic block (CLB) in a FPGA device such as the XILINX® XC4025E FPGA. In that case the FPGA may provide N=256 RAM modules in 128 CLBs to construct a 2-bit wide data sequence shift register, containing 256 8-bit data samples, which provides a tap for every other data sample.

For correlation, each of the N/2 8-bit data samples in the data sequence (corresponding to taps for every other data sample in the data sequence shift register) is multiplied by a reference value in the reference sequence, "A" or "B." In the embodiment of FIG. 3, each reference sequence value may be either plus one (+1) or minus one (−1). Each reference sequence data value is represented by a 1-bit binary number. A reference sequence bit is a logic zero to indicate a reference sequence value of plus one (+1), and a logic one to indicate a reference sequence value of minus one (−1).

The reference sequence bits for the reference sequences "A" and "B" are each stored in separate reference sequence storage registers 315 which each have N/2 stages.

For example, each reference sequence storage register 315 may be comprised of N/2 flip-flops in a FPGA device such as the XILINX® XC4025E FPGA. In that case, for each reference sequence of length N/2=128, each reference sequence storage register may comprise 128 flip-flops.

To perform the correlation with a reference sequence "A" or "B", every other data sample in the data sequence must first be multiplied by a reference sequence value of plus one (+1) or minus one (−1). The 8-bit data samples are represented in two's-complement arithmetic, as noted above. As is well known to those skilled in the art, to multiply a two's-complement number by minus one (−1), all of the bits must be inverted, and then a one must be added. For example, to complement the number +4 (0000 0100), all bits are inverted (1111 1011) and then one is added to produce (1111 1100)=−4 in two's-complement.

The first step of multiplying each data sample of the data sequence by the corresponding reference sequence value may be performed by an XOR gate. A first input to the XOR gate is connected to one bit of the data sample from the data sequence shift register. The second input to the XOR gate is connected to a reference sequence bit from the reference sequence register. The reference sequence bit is a zero to indicate multiplication by plus one (+1), and a one to indicate multiplication by minus one (−1).

The XOR gate functions as a selective-complementer. The output of an XOR gate is the same as the input data sample bit when the reference sequence bit is zero, and is the inverse of the input data sample bit when the reference sequence bit is one. Thus the XOR gate either inverts or does not invert one data sample bit each correlator clock period.

In a preferred embodiment, two XOR gates are used simultaneously to invert or not invert two bits of each data sample provided from the data sequence shift register during each correlator clock period. Over four correlator clock periods, these two XOR gates invert, or do not invert, (as the case may be) all eight bits of an 8-bit data sample.

The resulting data from the XOR gates is an unfinished two's-complement product, as the increment that needs to be done after the XOR, if the data was inverted, is not yet performed. To produce a final two's-complement product, an addition of one is required. However, adding this one for each correlation product requires a substantial amount of additional circuitry. Advantageously, in the preferred embodiment dual correlator 300, this addition is performed in another stage of the dual correlator 300 which is discussed later. Thus the XOR gates produce correlation products represented as unfinished two's-complement numbers.

In the dual correlator 300, on each correlator clock cycle, the 2-bit wide data sequence shift register comprised of the RAM modules 310 provides two bits of the 8-bit data samples, tapped at every other data sample, to XOR gates 320. One input of each XOR gate 320 is connected to one tap for one bit of the 2-bit wide data sequence shift register. The other input of each XOR gate 320 is connected to one tap from one of the reference sequence registers 315.

For correlation with both of the reference sequences "A" and "B", of length N/2, there are 2N XOR gates 320, N gates for each reference sequence. For example, in the case where dual correlator 300 correlates the data sequence against two reference sequences "A" and "B" of length N/2=128, then the dual correlator has 512 XOR gates, 256 for reference sequence "A" and 256 for reference sequence "B". The 256 XOR gates for each reference sequence are divided into 128 XOR gates for the LSBs and 128 XOR gates for the next least significant bits (NLSB)s.

Thus on each correlator clock cycle, the N XOR gates for correlation with each reference sequence produce N/2 2-bit correlation products. Every four correlation clock cycles, all eight bits of the N/2 8-bit data samples are processed to produce a new correlation value.

Figure 1:
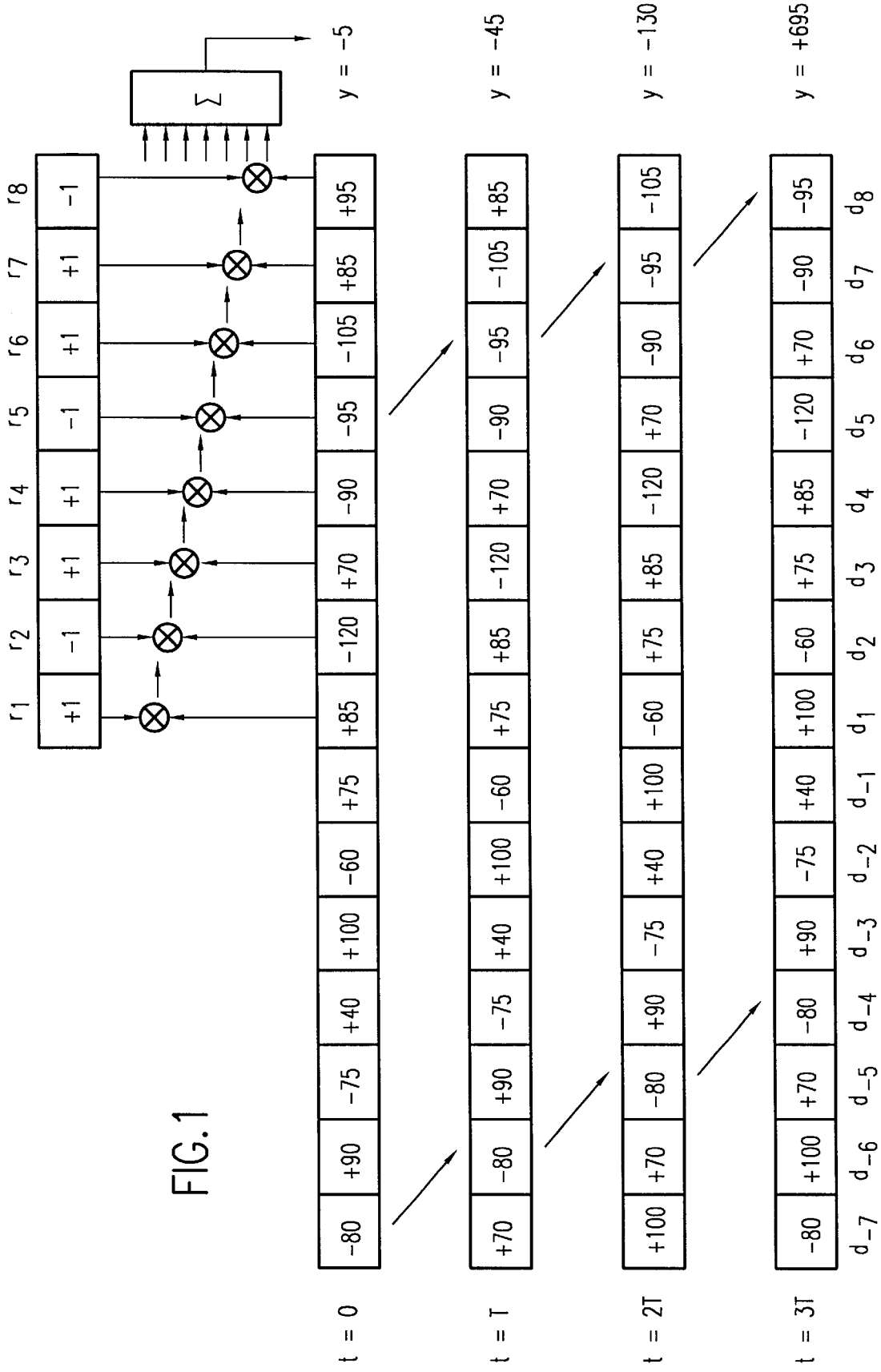
FIG. 1 is a timing diagram illustrating the operation of a correlator in a communication receiver.
Figure 2:
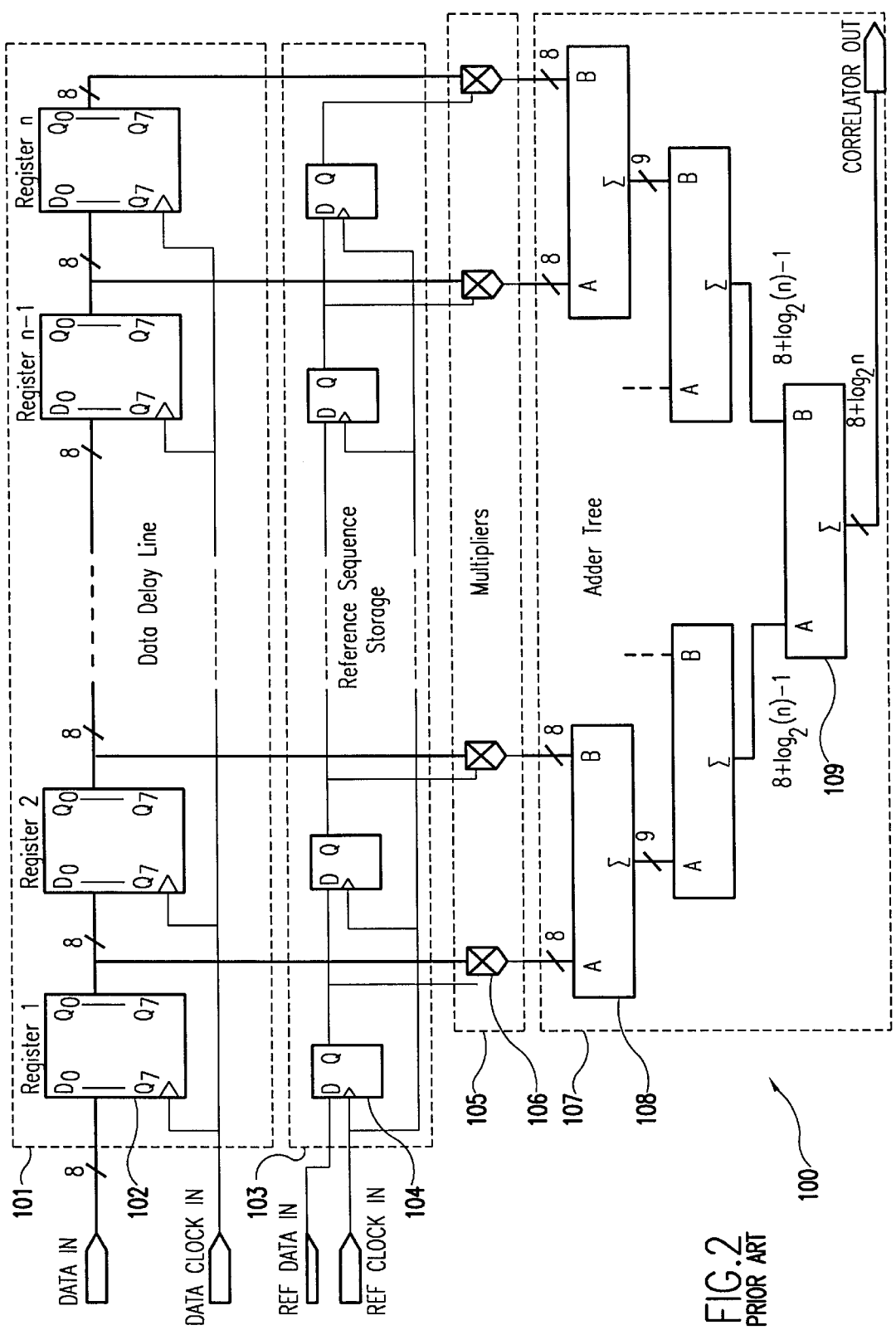
FIG. 2 is a functional block diagram of a prior art digit correlator.

To produce a correlation value, during each correlator clock cycle, each of the N/2 2-bit unfinished two's-complement correlator products from the XOR gates 320 must be summed together and this sum in turn must be added into an accumulator. As discussed with respect to the prior art correlator of FIG. 1, if conventional adders were used, adding N/2 correlator products would require (N/2)−1 adders of various length, consuming many gates.

Instead, advantageously, adders in the dual correlator 300 include population counters to add the N/2 2-bit correlation products during each correlator clock cycle. Thus, during a first correlator-clock cycle, groups of 15 of the N/2 LSB correlation products are fed into 15-bit population counters 325. The output of each 15-bit population counter 325 is a 4-bit unsigned binary value, ranging from zero to +15, indicating the number of the 15 correlation product LSB inputs that are ones. At the same time groups of 15 of the N/2 NLSB correlation products are also fed into identical 15-bit population counters 325. For each reference sequence "A" and "B", there are a total of 2*[N/2-modulo-15] 15-bit population counters, one half for adding the LSB products and one half for adding the next least significant bit (NLSB) products.

FIG. 4 is a block diagram of a preferred embodiment of a 15-bit population counter 325 which may be used in the dual correlator 300. The 15-bit population counter 325 of FIG. 4 consists of three pipelined stages.

In the first stage of the population counter 325, three groups of four bits each are supplied to three first-stage groups 410 comprised of three encoders 405. Each first-stage group 410 of encoders 405 encodes the four input bits into a 3-bit binary number indicating how many of the four bits are ones. That is, each first-stage group produces three intermediate outputs having weights $2^0$, $2^1$ and $2^2$. The remaining three bits of the 15-bit input are supplied to a fourth first-stage group 415 of two encoders 405. The fourth first-stage group 415 encodes the three bits into a 2-bit binary number, producing two intermediate outputs having weights $2^0$ and $2^1$, again indicating how many of the three input bits are ones. Thus, in the first stage, the population counter 325 produces a total of four $2^0$ bits, four $2^1$ bits and three $2^2$ bits.

In the second stage of the 15-bit population counter 325, the four $2^0$ bits from the first stage are supplied to a first second-stage group 420 of three encoders 405. The first second-stage group 420 of encoders 405 encodes the four $2^0$ bits into a 3-bit binary number indicating how many of the four bits are ones. That is, the first second-stage group 420 produces three intermediate outputs having weights $2^0$, $2^1$ and $2^2$.

Similarly, the four $2^1$ bits from the first stage supplied to a second second-stage group 425 of three encoders 405. The second second-stage group 425 of encoders 405 encodes the four $2^1$ bits into a 3-bit binary number indicating how many of the four bits are ones. That is, the second second-stage group 425 produces three intermediate outputs having weights $2^1$, $2^2$ and $2^3$.

Also, the three $2^2$ bits from the first stage are supplied to a third second-stage group 430 of two encoders 405. The third second-stage group 430 of encoders 405 encodes the three input bits into a 2-bit binary number indicating how many of the three bits are ones. That is, the third second-stage group 430 produces three intermediate outputs having weights $2^2$ and $2^3$.

Next, the two $2^1$ bits from the first and second second-stage group, 420, 425, of encoders are added together in a half-adder circuit 435 to produce a final $2^1$ bit and another $2^2$ bit. In parallel, the two $2^2$ bits from the second and third second-stage group, 425, 430, of encoders are added together in another half-adder circuit 435 to produce a third $2^2$ bit and a third $2^3$ bit. Thus, in the second stage, the population counter 325 produces one $2^0$ bit, one $2^1$ bit, three $2^2$ bits, and three $2^3$ bits.

In the third stage of the population counter 325, the $2^0$ and $2^1$ bits are copied as final output bits of the population counter. The three $2^2$ bits are supplied to a third-stage group 440 of two encoders 405. The third stage group 440 of encoders 405 encodes the three input bits into a 2-bit binary number indicating how many of the three bits are ones. That is, the third-stage group 440 produces two outputs, having weights $2^2$ and $2^3$. The $2^2$ bit is provided as a final $2^2$ output bit of the population counter 325.

There are now remaining a total of four $2^3$ bits to be processed. However, the total number of inputs to the 15-bit population counter 325 is 15 so the number of ones cannot exceed 15. So at most, the number of $2^3$ bits can be equal to one. The four $2^3$ bits are therefore applied to an OR-gate 445 to produce the final $2^3$ bit as an output of the population counter 325.

In a preferred embodiment, each 15-bit population counter 325 in a dual correlator 300 is constructed using configurable logic blocks (CLBs) in a FPGA device such as the XILINX® XC4025E FPGA. In that case, the first stage of the 15-bit population counter requires a total of five and one-half CLBs, the second stage requires a total of four and one-half CLBs, and the third stage requires a total of two CLBs. In that case, the 15-bit population counter requires a total of 12 CLBs.

In summary, for each of the two reference sequences "A" and "B", the dual correlator 300 includes 2*[N/2-modulo-15] 15-bit population counters 325 to perform unsigned addition of the 2-bit wide unfinished two's-complement correlation products produced by the XOR gates 320 during each correlator clock cycle. The 15-bit population counters each produce 4-bit unsigned binary number outputs which are supplied to adder trees 330, 335 which are discussed below. The remainder of the LSB correlation products and NLSB correlation products not supplied to the 2*[N/2–modulo–15] 15-bit population counters are supplied to the adder trees 330 and 335 respectively.

For example, for correlation with a reference sequence of length N/2=128 (N=256), the dual correlator 300 includes [256/2–modulo–15]=8 (eight) 15-bit population counters (summing 8*15=120 of the 128 product bits) producing eight 4-bit unsigned binary numbers for the LSB correlation products, and another eight 15-bit population counters producing eight 4-bit unsigned binary numbers for the next least significant bit (NLSB) correlation products. In that case, the final group of eight of the 128 LSB products is supplied to the carry inputs of the adder tree 330. Similarly, the final group of eight of the 128 NLSB products is supplied to the carry inputs of the second adder tree 335.

Each adder tree 330, 335 is a conventional adder tree summing together the 4-bit unsigned binary numbers from the 15-bit population counters. Care is taken to properly align the results to take into account the proper weighting for the bit positions being added at each stage. The output of the adder tree 335 for the NLSB products is shifted over one place to the left to multiply by 2 before it is added to the output of the adder tree 330 for the LSB products to produce the sum of all of the N/2 2-bit correlation products. The maximum value of this sum is (N/2)*3=3N/2. For example, where N=256 corresponding to a correlator of length 128, the maximum sum is 384 which requires a 9-bit representation.

The sum of all of the N/2 2-bit correlation products produced during each correlation clock cycle is applied to the upper bit inputs of an accumulator 340. Recall that the 8-bit data values are processed two bits at a time over four correlator clock cycles. During a first correlator clock cycle, the correlator processes the LSB and NLSB bits of each data sample. Consequently, the feedback from the accumulator 340 is shifted right-two bits in a shift register 350 to reduce its significance by four with respect to the sum from the next N/2 bit-pairs processed during the next correlator clock cycle.

During each of the next three correlator clock cycle, the 2-bit wide data sequence shift register is shifted to the right one place. Each time, the sum of the correlation products is added in the accumulator 340 with four times the weighting of the previous result and is summed two bits to the left of the previous accumulator total.

The result of all four summations over four correlation clock cycles is an unsigned binary number, the maximum value of which is N/2 times the maximum 8-bit value, that is 255*(N/2) which requires $8+\log_2(N/2)$ bits to represent. For example, if N=256, then N/2 is 128 and the maximum value is 32,640 which requires 15 bits to represent.

Finally, to obtain the correct two's-complement correlation value, two last operations must be performed. First, the result must be corrected for the unfinished two's- complement arithmetic used in the multiplication process. To do this, the correlator must add in all of the ones that were not added when it performed the XOR selective-complementing function on the data samples. Advantageously, a micro controller which controls the operation of the dual correlator provides a selective-complement correction value which represents the number of data sequence samples that were complemented by the XOR gates, corresponding to the number of bits in the reference sequence register that were ones.

Second, the corrected result must be compensated for the fact that the population counters treated the incoming data from the XOR gates as unsigned data. The sign of the result will be wrong if it is not inverted. The correlator provides a sign correction value to be added to provide this compensation. In a preferred embodiment where N=256, the sign correction value is $4000_{16}$.

In a preferred embodiment, both of the above operations are accomplished by having the micro controller add the sign correction value to the selective-complement correction value, and then adding the result at one time in a correction adder 355 to compensate for both the unsigned conversion in the population counters and the unfinished two's-complement arithmetic in the XOR gates. Alternatively, the combined correction value could be preloaded into the accumulator at the beginning rather than added at the end.

Thus for each data clock cycle, the dual-correlator produces a correct two's-complement correlation value corresponding to the reference sequence "A." The dual-correlator 300 includes duplicates of everything except the 2-bit wide data shift register to produce a second correlation value for the second reference sequence "B."

The correlation values for reference sequences "A" and "B" may each be compared to a correlation reference threshold value to detect a correlation event as is well known in the art.

In a preferred embodiment, the dual correlator 300 is constructed in an FPGA. In a preferred embodiment, the FPGA is a XILINX® XC4025E FPGA. In that case, the use of RAM modules to implement the 2-bit wide data sequence shift register, the reuse of the data sequence shift register to perform two correlation functions, and the population counters all contribute to allow two very long data sequence correlators to be implemented in a single FPGA, whereas a conventional correlator of the prior art would-not fit.

For example, according to the present invention, a dual correlator for correlating a data sequence against two reference sequences each of length N/2=128, may be constructed in a single XILINX® XC4025E FPGA. In that case, the 2-bit wide data sequence shift register may contain 256 8-bit data samples, tapped at every other data sample. This is useful, for example, to correlate I or Q receiver data which is sampled twice per symbol period to provide additional coarse timing information to the communication receiver.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A correlator for correlating a data sequence comprising a plurality of two's-complement data samples with a reference sequence comprising a plurality of reference sequence values, to produce a two's-complement correlation value, comprising:

a data sequence shift register for receiving and storing the two's-complement data samples;

a reference register for receiving and storing the reference sequence values;

a plurality of multipliers for multiplying each of the two's-complement data samples by one of the reference sequence values to produce a plurality of unfinished two's-complement correlation products;

an adder for summing the plurality of unfinished two's-complement correlation products in unsigned arithmetic to produce unsigned correlation results; and an accumulator for accumulating partial sums of the unsigned correlation results and adding a correction factor to the partial sums to produce a two's-complement correlation value.

2. The correlator of claim 1, wherein the data sequence shift register comprises a plurality of random access memories.

3. The correlator of claim 1, wherein the plurality of multipliers are exclusive-OR gates.

4. The correlator of claim 1, wherein the adder includes one or more population counters.

5. A correlation method of correlating a data sequence comprising a plurality of two's-complement data samples with a reference sequence comprising a plurality of reference sequence values, to produce a two's-complement correlation value, comprising the steps of:

sequentially multiplying portions of each of the two's-complement data samples by one of the reference sequence values to produce a plurality of partial correlation products;

weighting each of the plurality of partial correction products based in where in the data sample they were obtained;

summing the plurality of weighted partial correlation products in an adder to produce an incomplete two's-complement correlation result; and adding a correction factor to the incomplete two's complement correlation result to produce a corrected two's-complement correlation values wherein the sequential multiplying, weighting, and adding are performed at a frequency multiple of a data arrival rate of the data sequence, and wherein the frequency multiple is proportional to the number of the portions of each of the two's complement data samples.

6. The correlation method of claim 5, wherein the step of sequentially multiplying is performed by a plurality of exclusive-OR gates.

7. The correlation method of claim 5, wherein the adder includes one or more population counters.

* * * * *